(12) United States Patent
Noguchi et al.

(10) Patent No.: US 6,344,526 B1
(45) Date of Patent: *Feb. 5, 2002

(54) FLUORINE-CONTAINING EPOXY RESIN COMPOSITION, AND SURFACE MODIFICATION PROCESS, INK JET RECORDING HEAD AND INK JET RECORDING APPARATUS USING SAME

(75) Inventors: Hiromichi Noguchi, Hachioji; Akihiko Shimomura, Yokohama; Isao Imamura; Tamaki Sato, both of Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/263,871

(22) Filed: Mar. 8, 1999

(30) Foreign Application Priority Data

Mar. 10, 1998 (JP) .......................... 10-057637
Mar. 10, 1998 (JP) .......................... 10-057639

(51) Int. Cl.⁷ ...................... C08F 283/00; C08G 59/68; G01P 15/16; G03C 5/00
(52) U.S. Cl. ...................... 525/527; 525/403; 525/481; 528/88; 528/90; 427/493; 427/508; 427/510; 346/140.1; 430/326
(58) Field of Search ...................... 528/88, 90; 525/481, 525/527, 403; 427/493, 508, 510; 346/140.1; 430/326

(56) References Cited

U.S. PATENT DOCUMENTS

| | | | | |
|---|---|---|---|---|
| 3,872,045 A | * | 3/1975 | Field et al. .................... | 528/88 |
| 3,907,706 A | * | 9/1975 | Robins ........................ | 525/481 |
| 4,254,000 A | * | 3/1981 | Ohmori et al. .............. | 525/481 |
| 4,267,302 A | | 5/1981 | Ohmori ....................... | 528/103 |
| 4,284,746 A | * | 8/1981 | Ohmori ....................... | 525/510 |
| 4,360,645 A | * | 11/1982 | Krespan et al. ............. | 525/403 |
| 4,363,898 A | * | 12/1982 | Krespan et al. ............. | 525/481 |
| 4,877,859 A | * | 10/1989 | Tamaru et al. .............. | 525/481 |
| 4,959,426 A | * | 9/1990 | Re et al. ..................... | 525/481 |
| 5,043,747 A | | 8/1991 | Ebisawa et al. ........ | 346/140 R |
| 5,079,299 A | * | 1/1992 | Hisamoto et al. ........... | 525/100 |

FOREIGN PATENT DOCUMENTS

| | | |
|---|---|---|
| EP | 0 030 432 A1 | 6/1981 |
| EP | 271872 * | 6/1988 |
| EP | 0 295 639 A2 | 12/1988 |
| EP | 0 430 722 A2 | 6/1991 |
| EP | 0 572 179 A2 | 12/1993 |
| EP | 0 779 337 A1 | 6/1997 |
| FR | 2 437 423 | 4/1980 |
| JP | 2-039944 | 2/1990 |
| JP | 3-007781 | 1/1991 |
| JP | 6-328698 | 11/1994 |

OTHER PUBLICATIONS

"Synthesis and Properties of a Novel Fluorine–Containing Alicyclic Diepoxide", T. Maruno, et al., Macromolecules, vol. 29, No. 6, Mar. 11, 1966.

Patent Abstracts of Japan, vol. 016, No. 098 (C–0918) Mar. 11, 1992, with respect to JP 03 277,676 A of December 9, 1991.

* cited by examiner

Primary Examiner—Philip Tucker
(74) Attorney, Agent, or Firm—Fitzpatrick, Cella Harper & Scinto

(57) ABSTRACT

A resin composition comprising a fluorine-containing aliphatic epoxy resin having in one molecule at least one perfluoroalkyl group having 6 to 12 carbon atoms and at lest two epoxy groups, a cationic polymerization catalyst, and optionally a compatibilizing agent having an epoxy group and a fluoromethyl group is applied to a discharge opening surface of an ink jet recording head, followed by irradiation with an activation energy ray in a given pattern to form a cured film in a desired pattern, so that the discharge opening surface is endowed with ink repellency.

9 Claims, 3 Drawing Sheets

FLUORINE-CONTAINING EPOXY RESIN COMPOSITION, AND SURFACE MODIFICATION PROCESS, INK JET RECORDING HEAD AND INK JET RECORDING APPARATUS USING SAME

BACKGROUND OF THE INVENTION

1. Field of the Invention

The present invention relates to a polymerizable resin composition that enables water-repellent and ink-repellent treatment in a desired pattern, and more particularly to a resin composition that is capable of polymerizing by irradiation with ultraviolet light to form a coating in a desired pattern. The present invention also relates to a process for surface modification making use of such a composition, an ink jet recording head subjected to ink-repellent-treatment by the use of the composition, and an ink jet recording apparatus making use of the same.

2. Related Background Art

In various technical fields, there is commonly known a method of applying a water-repellent coating material to a member required to have water repellency or ink repellency so as to be endowed with such properties. Resin materials and coating materials used therefor have been developed.

As water- and oil-repellent coating materials, fluororesin- and silicone resin-type coating materials are most commonly available. Specifically, fluorine type coating materials having a fluoroolefin or perfluoro group are very stable both thermally and chemically, are excellent in weathering resistance, water resistance, chemical resistance, solvent resistance, or the like, and are also excellent in release properties, wear resistance and water repellency, thus they are widely used for various purposes. Silicone resins have good water repellency and oil repellency but have a low hardness alone, and, for this reason, are often combined with other types of resins such as acrylic resin, epoxy resin, urethane resin and so on or modified to make up coating material compositions.

Meanwhile, in the ink Jet (liquid jet) recording heads in which a liquid is discharged from discharge openings in the form of small droplets to cause the liquid to adhere to paper or the like to thereby perform recording or form images, there have been continued such improvement in performance as smaller droplets, higher driving frequency and a larger number of discharge openings in order to improve the recording characteristics. Accordingly, it has become more and more important to perform surface treatment of the discharge opening surface so that the surface state can always be kept constant with ease.

However, by use of such existing water- and oil-repellent coating materials, it is difficult to perform surface treatment of the discharge opening surface selectively, or precisely in a pattern, in such a way that the ink does not adhere to the surface. The reasons therefor are as follows:

(1) In order to impart properties like those of photoresists, a substance (compound) having a photosensitive functional group must be used as a main component. However, from the viewpoint of synthesis techniques, it is not easy to design molecules so that such a compound can have water repellency and ink repellency at the same time.

(2) The surface treatment of an ink jet recording head must be accomplished in a very small layer thickness of several $\mu$m or less so as not to obstruct the function of minute nozzles. However, it is difficult to control the existing coating materials so as to have such a layer thickness.

In instances where the surface treatment has been attained by the existing fluorine type materials, the structure of coatings must be so designed as to be able to maintain the surface properties for a long term. However, most water- and oil-repellent materials have so low a coating hardness as to have a poor wear resistance, or may cause a lowering of water and oil repellency with occurrence of contamination and can be restored with difficulty in many cases. In this sense, they can not necessarily be satisfactory as materials for the surface treatment of discharge opening surfaces of ink jet recording heads.

Thus, at present, the ink discharge openings used in the ink jet recording system where an ink is ejected in the form of small droplets to effect recording are expected to have the characteristics shown below.

(1) The ink as the residue of ink columns having turned into droplets is held back immediately into the discharge opening.

(2) Ink droplets having adhered to the surface are swept out with ease by a cleaning operation.

(3) The discharge opening surface of the recording head is excellent in scratch resistance against the cleaning operation and paper carrying.

(4) In repeated liquid droplet formation and ink refilling, a meniscus is formed at the position of the discharge opening surface.

(5) The normal direction of the meniscus is in the direction of discharge.

(6) Even with a low surface tension of an ink used or under a small negative pressure, an interfacial tension, i.e., a contact angle, high enough to form a meniscus is retained.

(7) Since ink jet recording liquid is mostly adjusted to have a basicity of pH 7 to 11 for providing dissolution stability, structural materials are selected which can provide structural members with excellent alkali resistance and hydrolysis resistance.

The reason for requiring these characteristics is that, in the ink-jet recording head, any recording liquid such as ink which adheres to the circumference of the discharge openings directly affects printing performance in that it causes aberration in the discharge (flying) direction of liquid droplets discharged from the discharge openings to make it impossible to effect printing at a high precision.

As the prior art concerning the present invention, publications are available which disclose formation of a resin thin film by gas phase polymerization using a lacquer type fluororesin coating material, a fluorine type ultraviolet-curing coating material, a heat-curing fluororesin coating material, a fluorine type silane coupling agent or an epoxy resin composition having fluororesin particles dispersed therein.

For example, Japanese Patent Application Laid-Open No. 2-39944 discloses carrying out an ink-repellent treatment with a polymer having a fluoroacetyl group and a silazane group.

Such a coating material, however, could not necessarily achieve both water repellency and coating durability in some cases.

Japanese Patent Application Laid-Open No. 3-7781 also discloses an ink-repellent treating agent using a glycidyl ether derived from a fluorine type diol. A fluorine type epoxy resin disclosed therein was cured when used, and hence was advantageous in coating durability, but was not satisfactory in ink repellency.

Japanese Patent Application Laid-Open No. 6-328698 also discloses a method and a material for making openings with an excimer laser which is a breaking active energy ray. The method disclosed therein can achieve a superior processing precision and is useful for the production of ink-jet recording heads suited for the method, but may be applied with difficulty to an ink-repellent treatment using photolithography for attaining more precise processing.

Thus, under the existing circumstances, when the conventional materials and methods are adopted, no satisfactory surface treatment has been obtained which attains water-repellent and ink-repellent treatment with high precision and durability, and there is a continuing need for improvement.

SUMMARY OF THE INVENTION

An object of the present invention is to provide a resin composition for water-repellent treatment promising the above characteristics as coatings.

Another object of the present invention is to provide a fluorine-containing epoxy resin composition suited as a water-repellent agent or water-repellent coating material applied to places having opportunities of contact with solutions or materials containing components that may damage film forming properties or adhesion of water repellent agents, such as polar organic solvents, and also to provide an ink jet recording head endowed with a good ink repellency by the use of such a composition, and an ink jet recording apparatus using such a recording head.

A first embodiment of the resin composition of the present invention is a fluorine-containing epoxy resin composition comprising a fluorine-containing aliphatic epoxy resin comprising in one molecule at least one perfluoroalkyl group having 6–12 carbon atoms and at least two epoxy groups, and a cationic polymerization catalyst.

The term "perfluoroalkyl" as used in the specification and claims refers to an alkyl group in which all the hydrogen atoms are substituted with fluorine atoms.

As the fluorine-containing aliphatic epoxy resin used in the present invention, there can preferably be used at least one of the compounds represented by the following general formulae (A-1) and (A-2):

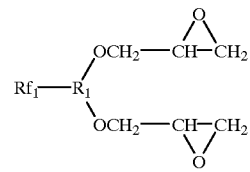

(A-1)

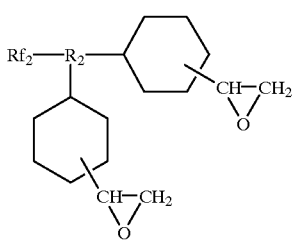

(A-2)

wherein $Rf_1$ and $Rf_2$ are independently selected from $(CF_2)_n$—$CF_3$ or

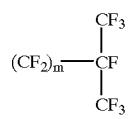

wherein n is 5–11 and m is 3–9;
and $R_1$ and $R_2$ are aliphatic groups.

A second embodiment of the resin composition of the present invention is a fluorine-containing epoxy resin composition comprising a fluorine-containing polyether resin comprising in a main chain an alicyclic hydrocarbon group comprising in a side chain at least one perfluoroalkyl group having 6–12 carbon atoms and at least two epoxy groups, and a cationic polymerization catalyst.

As the fluorine-containing polyether resin of the second embodiment of the resin composition of the present invention, there can preferably be used a polymer comprising an epoxy structural unit represented by the following general formula (D-1) or (D-2) and a perfluoro structural unit represented by the following general formula (D-3) or (D-4):

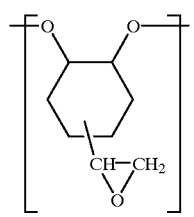

(D-1)

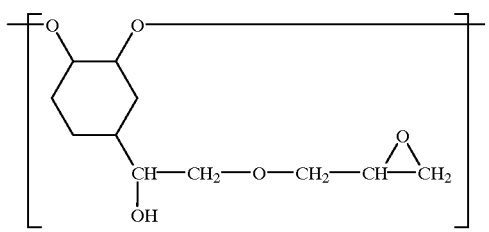

(D-2)

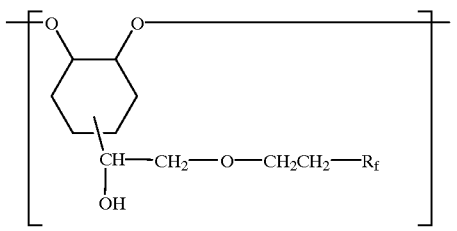

(D-3)

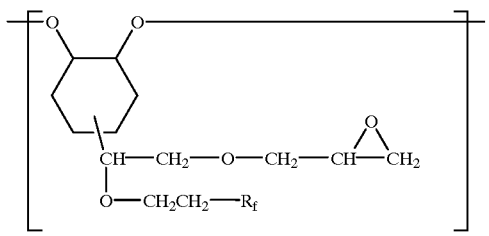

(D-4)

wherein Rf is selected from $CF_3$—$(CF_2)_x$— or

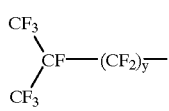

wherein x is 5–11 and y is 3–9;
and the total number of the structural units is 3–28.

The fluorine-containing aliphatic epoxy resin composition of the present invention may further contain as a compatibilizing agent, at least one of the compounds represented by the following formulae (C-1) and (C-2) as the occasion demands.

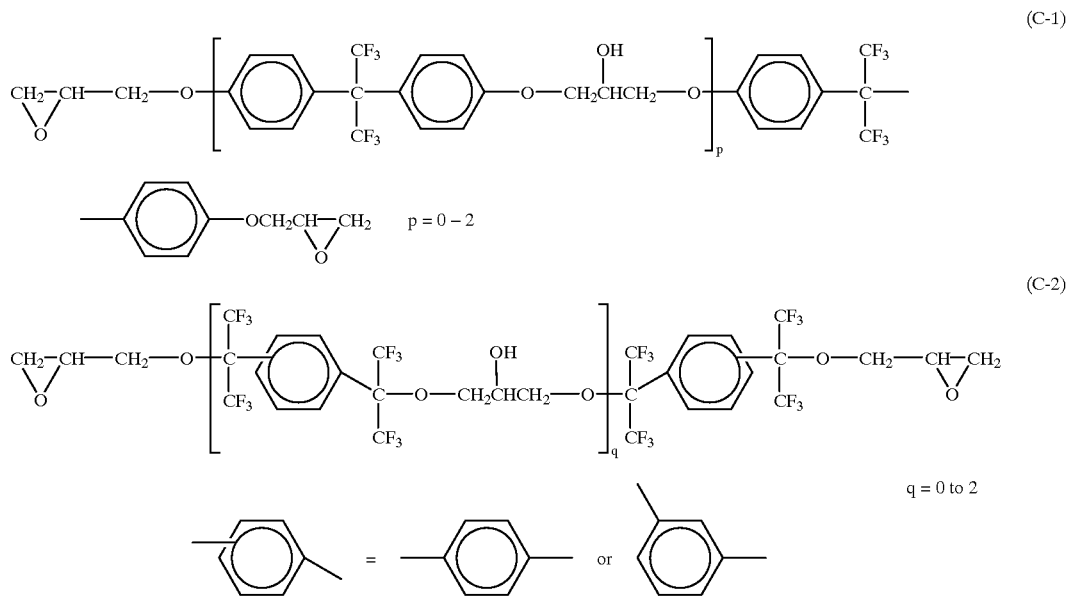

Still another object of the present invention is to provide a surface treatment process for treating a surface of a substrate selectively, the process comprising successively:
- the first step of applying the fluorine-containing epoxy resin composition of the present invention onto a substrate and drying the applied resin composition;
- the second step of irradiating the applied composition with an activation energy ray in a pattern through a mask;
- the third step of dissolving and removing a part of the applied composition not irradiated with the activation energy ray, by use of a liquid capable of dissolving the composition; and if desired
- the fourth step of post-curing the remaining composition.

Yet another object of the present invention is to provide a surface treatment process for treating a surface of a substrate selectively, the process comprising successively:
- the first step of applying the fluorine-containing epoxy resin composition of the present invention onto a substrate and drying the applied resin composition;
- the second step of heating or irradiating with an activation energy ray the applied composition to effect polymerization and curing over the whole area thereof;
- the third step of selectively irradiating the cured composition with a breaking activation energy ray to partly remove the cured composition; and if desired the fourth step of post-curing the remaining composition.

Yet still another object of the present invention is to provide an ink jet recording head having a discharge opening surface with a discharge opening for discharging a recording liquid therethrough, wherein at least a discharge opening formed portion of the discharge opening surface is coated with a cured film comprising the fluorine-containing epoxy resin composition of the present invention, and an ink jet recording apparatus comprising the ink jet recording head.

Since the resin composition of the present invention is of an epoxy resin type, it has an excellent adhesion to various members, can be cured at a relatively low temperature, and can provide a cured product having excellent physical properties as a structural member. Further, since the epoxy compound having a perfluoro group at the terminal is contained, the resin composition is improved greatly in resistance to water-soluble organic solvents, in particular, to polar organic solvents. Moreover, the action of a compatibilizing agent makes the components compatible with one another, so that the scope of material constitution can be broadened.

The fluorine-containing epoxy resin composition of the present invention is useful as a material applied to places having opportunities of contact with solutions or materials containing components that may decrease the adhesion of water repellent agents, such as polar organic solvents. As a water-repellent material or water-repellent coating material used on such places, the present resin composition is especially suited for water-repellent and ink-repellent treatment of discharge opening surfaces of ink jet recording heads.

In the ink jet recording apparatus of the present invention, the employment of selective surface modification utilizing photopolymerizability enables highly precise treatment, and constituting the cured film of specific materials can provide water-repellent or ink-repellent areas having superior solid strength and anti-friction strength.

DESCRIPTION OF THE PREFERRED EMBODIMENTS

Figure 1:
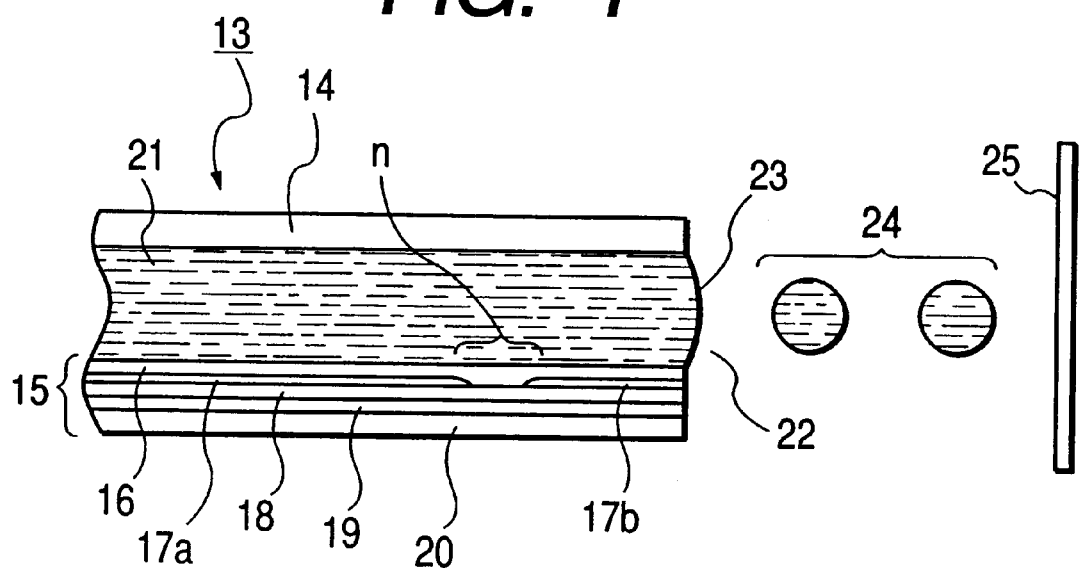
FIG. 1 is a cross-sectional view of the main part of a constitutional example of an ink jet recording head to which the present invention is applied.

The fluorine-containing aliphatic epoxy resin of the first embodiment of the present invention comprises in one molecule (i.e., per molecule) at least one perfluoroalkyl group and at least two epoxy groups. Even when the epoxy groups react, since the perfluoroalkyl group is present on the relatively outer side of the molecule, a high density of fluorine atoms can be kept on the surface of the resin. This is presumed to enable formation of a layer that exhibits water repellency, oil repellency and ink repellency in the surface while keeping a hard resin layer inside.

In the present invention, as the fluorine-containing aliphatic epoxy resin, there can preferably be used at least one of the compounds represented by the following general formulae (A-1) and (A-2):

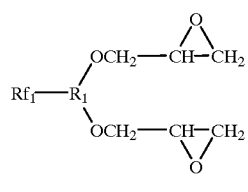
(A-1)

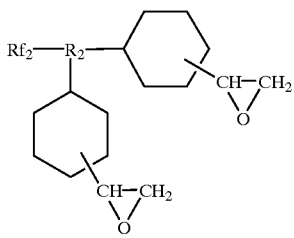
(A-2)

wherein $Rf_1$ and $Rf_2$ are independently selected from $(CF_2)_n$—$CF_3$ or

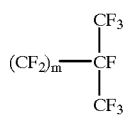

wherein n is 5–11 and m is 3–9;

and $R_1$ and $R_2$ are aliphatic groups.

As specific examples of the compound represented by the general formula (A-1), there are included, for example, the following compounds.

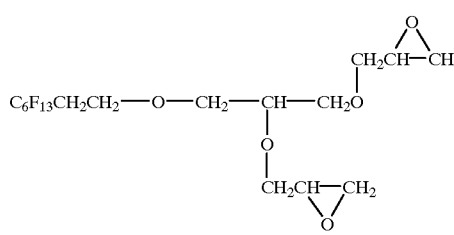
(A-1-1)

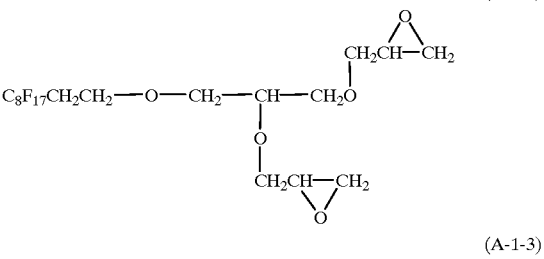
(A-1-2)

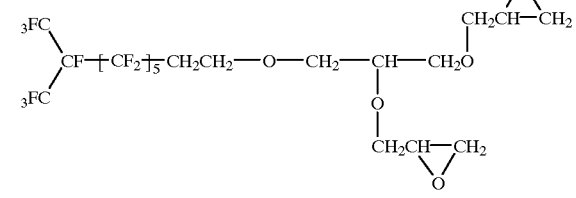
(A-1-3)

The above compounds are obtained by reacting epichlorohydrin with a perfluoroalkyl compound having a hydroxyl group in a terminal.

As specific examples of the compound represented by the general formula (A-2), there are included, for example, the following compounds.

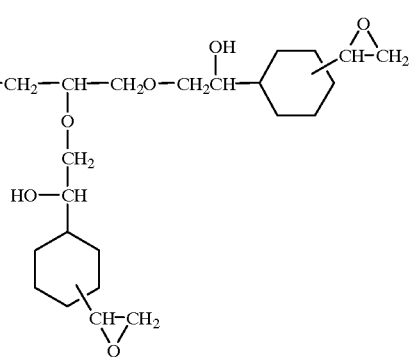
(A-2-1)

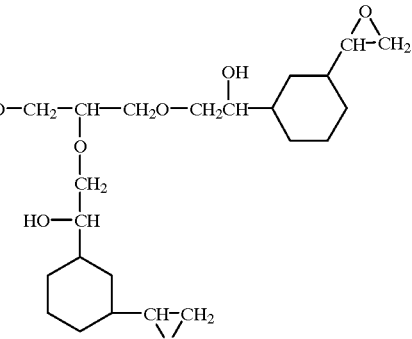
(A-2-2)

The fluorine-containing polyether resin used for the fluorine-containing epoxy resin composition of the second embodiment of the present invention comprises in a side chain at least one perfluoroalkyl group and at least two epoxy groups. Even when the epoxy groups react, since the perfluoroalkyl group is present on the relatively outer side of the molecule, a high density of fluorine atoms can be kept in the surface of the resin. This is presumed to enable formation of a layer that exhibits water repellency, oil repellency and ink repellency in the surface while keeping a hard resin layer inside.

In the present invention, as the fluorine-containing polyether resin, there can preferably be used a polymer comprising an epoxy structural unit represented by the following general formula (D-1) or (D-2) and a perfluoro structural unit represented by any one of the following general formulae (D-3-1) to (D-4-2) wherein the total number of the structural units is 3–28. The weight ratio of the epoxy structural unit to the perfluoro structural unit is epoxy structural unit: perfluoro structural unit=30:70 to 80:20 (parts by weight ratio).

(D-1)

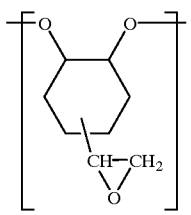

(D-2)

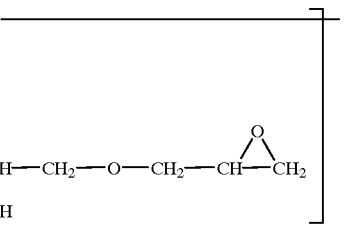

(D-3-1)

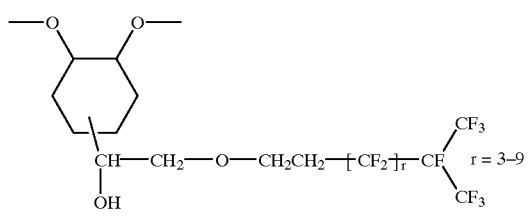
r = 3–9

(D-3-2)

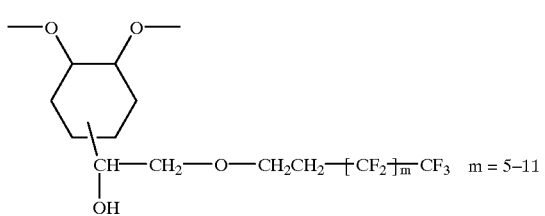
m = 5–11

(D-4-1)

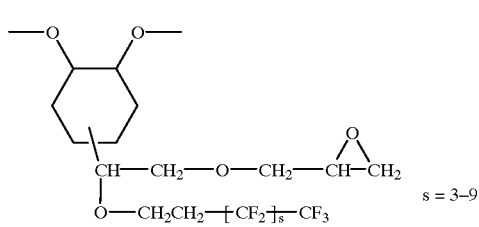
s = 3–9

(D-4-2)

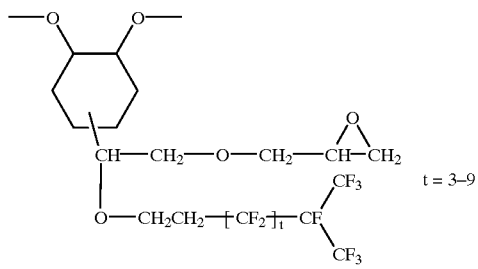
t = 3–9

Specifically, there can be included, for example, P1 to P10 shown in Table 1 below.

TABLE 1

| Compound D | Epoxy structural unit (percentage by weight) | Perfluoro structural unit (percentage by weight) |
|---|---|---|
| P1 | D-1: 80 | D-3-1 (r = 5): 20 |
| P2 | D-1: 75 | D-3-1 (r = 9): 25 |
| P3 | D-1: 60 | D-3-2 (m = 5): 40 |
| P4 | D-1: 50 | D-3-2 (m = 9): 50 |
| P5 | D-1: 45 | D-4-1 (s = 9): 55 |
| P6 | D-1: 35 | D-4-2 (t = 9): 65 |
| P7 | D-2: 35 | D-4-1 (s = 9): 65 |
| P8 | D-2: 30 | D-4-1 (s = 9): 70 |
| P9 | D-2: 35 | D-4-2 (t = 5): 65 |
| P10 | D-2: 35 | D-4-2 (r = 11): 65 |

The structural units may be incorporated in either a random fashion or a sequence of the same units.

The epoxy resin composition of the present invention contains a cationic polymerization catalyst (a polymerization initiator) as a catalyst for curing the composition. Compounds used for such purpose may be selected from substances known as curing agents for epoxy resins. Since the composition of the present invention is an epoxy resin composition, an aromatic or aliphatic amine or an acid anhydride may be added to effect polymerization by heat curing. In the present invention, however, the composition is so designed that it may have a high reactivity to an onium salt of a Lewis acid activated by an activation energy ray which enables especially low-temperature curing. Hence, the composition is suited for performing surface treatment selectively by photolithography and also for performing surface modification on substrates which can be held at a high temperature with difficulty.

As the cationic polymerization catalyst used in the present invention, there are preferably used bis(4-tert-butylphenyl) iodonium salts, and "OPTOMER SP-150" and "OPTOMER SP-170" (trade name; available from Asahi Denka Kogyo K. K.), represented by the following structural formulae.

OPTOMER SP-150:

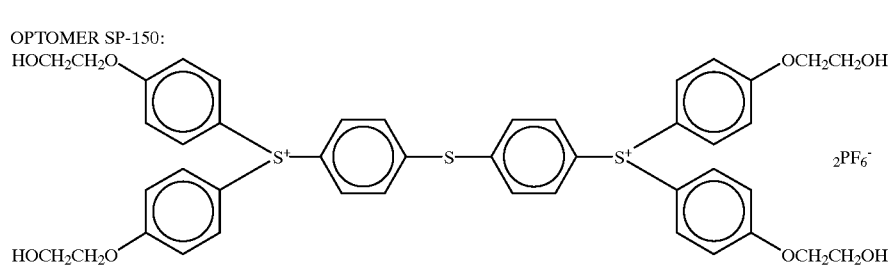
(B-1)

OPTOMER SP-170:

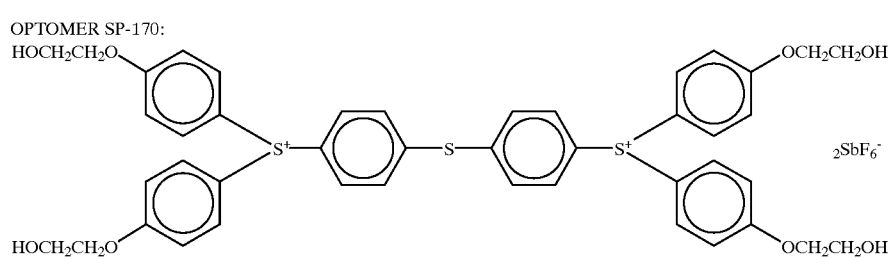
(B-2)

Further, IRGACURE 261 (trade name; available from Ciba Specialty Corp.) represented by the following structural formula may also be used.

IRGACURE 261:

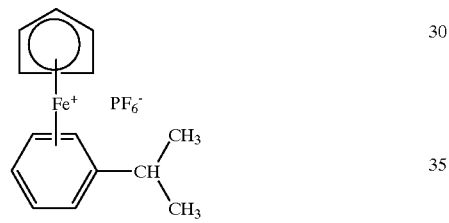
(B-3)

The fluorine-containing epoxy resin composition of the present invention may further contain, as a compatibilizing agent, at least one of the compounds represented by the following general formulae (C-1) and (C-2), as the occasion demands.

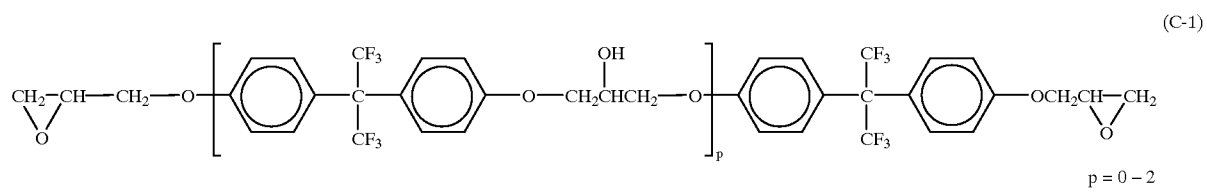
(C-1)
$p = 0 - 2$

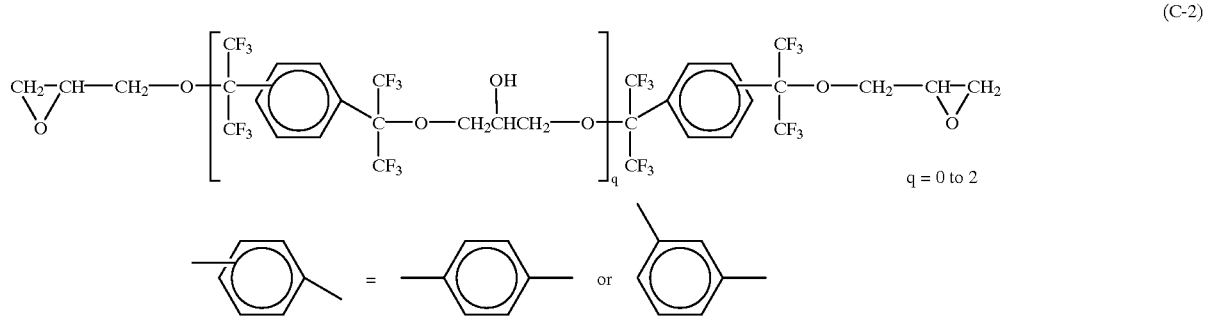
(C-2)
$q = 0$ to $2$

As specific examples of the compatibilizing agent, there may included, e.g., the compounds represented by the following structural formulae.

(C-1-1)
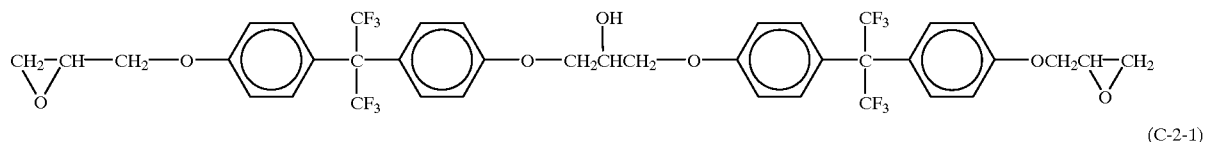

(C-2-1)
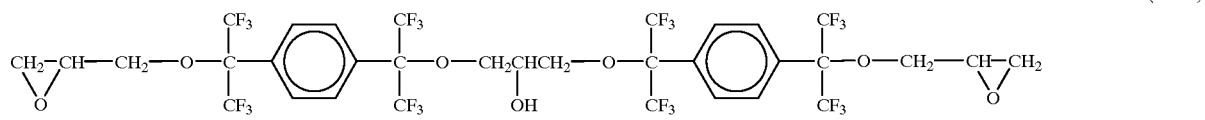

(C-2-2)
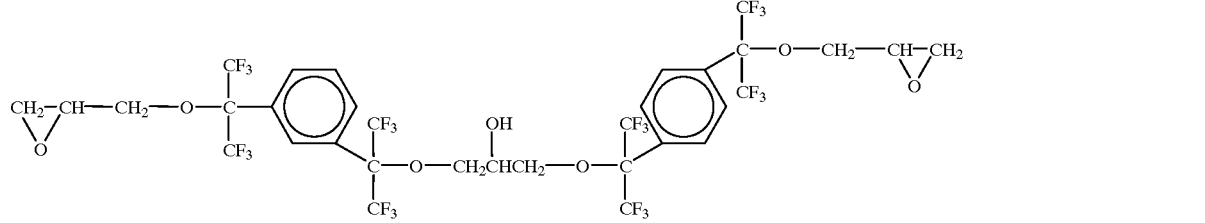

The above compatibilizing agent comprises fluorine atoms, but is constituted chiefly of fluoromethyl groups and has a small chain length. Hence, it has a small action of lowering the surface energy of the molecule, and does not have any great water repellency and ink repellency. It, however, is effective for improving the compatibility of the fluorine-containing aliphatic epoxy resin or fluorine-containing polyether resin with the cationic polymerization catalyst. Specifically, the instances where the compatibilizing agent is additionally used in the present invention are instances where the onium salt of a Lewis acid which is the cationic polymerization catalyst has a high polarity, so that practical difficulties such as its poor compatibility with the fluorine-containing aliphatic epoxy resin or fluorine-containing polyether resin used or unobtainability of leveling at the time of coating need to be overcome.

The epoxy resin composition of the present invention is basically classified into the following two embodiments.

(1) Composition containing:
  A: fluorine-containing aliphatic epoxy resin;
  B: cationic polymerization catalyst; and if desired
  C: compatibilizing agent.

(2) Composition containing:
  D: fluorine-containing polyether resin;
  B: cationic polymerization catalyst; and if desired
  C: compatibilizing agent.

In composition (1), the components A, B and C may preferably be in a mixing proportion described below.

The component B may be mixed in an amount ranging from 0.1 part by weight to 10 parts by weight on the basis of 100 parts by weight of the total epoxy resin component (the component A when the component C is not used, and the total of the components A and C when the component C is additionally used). The range of proportion is determined depending on factors including layer thickness, required pattern precision, degree of cross-linking of polymerized coatings, stability of development when developing is carried out, and rate of reaction when only curing alone is carried out. Taking account of such factors, the cationic polymerization catalyst may usually be used in an amount of from 0.1 to 7 parts by weight, and preferably from 0.3 to 5 parts by weight, on the basis of 100 parts by weight of the total of the epoxy resin component.

In the case where the compatibilizing agent component C is additionally used, it is used within the range of component A: component C=100:10 to 100:60 (weight ratio).

In the composition (2), these components D, B and C may preferably be in a mixing proportion described below.

The component B may be mixed in an amount ranging from 0.1 part by weight to 10 parts by weight on the basis of 100 parts by weight of the total epoxy resin component (the component D when the component C is not used, and the total of the components D and C when the component C is additionally used). The range of proportion is determined depending on factors including layer thickness, required pattern precision, degree of cross-linking of polymerized coatings, stability of development when developing is carried out, and rate of reaction when only curing alone is carried out. Taking account of such factors, the cationic polymerization catalyst may usually be used in an amount of from 0.1 to 7 parts by weight, and preferably from 0.3 to 5 parts by weight, on the basis of 100 parts by weight of the total of the epoxy resin component.

In the case where the compatibilizing agent component C is additionally used, it is used within the range of component D: component C=100:10 to 100:100 (weight ratio). That is, the component D must be 50% by weight or more of the epoxy resin component.

Constitutional examples of the composition of the present invention are exemplified below. In the following, the proportion indicates weight ratio of solid content.

(Compositional Example 1); A-1-1: B-2=99:1
(Compositional Example 2); A-1-2: B-2=96:4
(Compositional Example 3); A-1-2: B-1=95:5
(Compositional Example 4); A-2-1: B-2=96.5:3.5
(Compositional Example 5); A-2-1: B-3=95:5
(Compositional Example 6); A-1-3: B-2: C-2-1 =67:3:30
(Compositional Example 7); A-1-3: B-1: C-1-1 =64:1:35
(Compositional Example 8); A-2-2: B-1: C-1-1 =62:2:36

(Compositional Example 9); A-2-2: B-3: C-2-1 =70:3:27
(Compositional Example 10); P1: B-2=98:2
(Compositional Example 11); P2: B-2=97:3
(Compositional Example 12); P3: B-1=96:4
(Compositional Example 13); P4: B-3=95:5
(Compositional Example 14); P6: B-2: C-1 (p=0) =65:4:35
(Compositional Example 15); P7: B-2: C-1 (p=0) =70:3:30
(Compositional Example 16); P8: B-1: C-2 (q=1) =64:1:35
(Compositional Example 17); P9: B-1: C-2 (q=2) =50:2:48
(Compositional Example 18); P10: B-3: C-2 (q=0) =50:3:47
(Compositional Example 19); P10: B-3: C-2-2 =50:3:47

Other polymers may optionally be added to the fluorine-containing epoxy resin composition of the present invention. For example, a polymer having the function of a binder may be used, which also provides the functions of improving coating properties of the composition of the present invention and of improving drying characteristics after solvent evaporation to improve workability as drying coatings. Additional use of such a binder material is preferable when the composition of the present invention is exposed to light in a pattern to form a desired pattern shape.

Binder polymers that can be added to the fluorine-containing epoxy resin composition of the present invention may include alicyclic epoxy resin oligomers, acrylic resins obtained by copolymerization of acrylic monomers having no fluorine atomic group but having an epoxy group in a side chain, vinyl polymers obtained by polymerization of vinyl monomers having an alicyclic hydrocarbon group having an epoxy group in a side chain, polyether polymers having an alicyclic hydrocarbon group having an epoxy group in a side chain (e.g., EHPE3150 (trade name) available from Daicel Chemical Industries, Ltd.), which are most preferred as epoxy polymers also capable of participating in a cross-linking reaction by themselves. When polymers not having such an epoxy group are used, such polymers may be selected while intending the adjustment of physical properties in accordance with the purpose for which they are used. Such materials may include polymeric compounds for general-purpose coating materials, as exemplified by bisphenol type epoxy resin polymers PKHC and PKHJ (trade names) available from Union Carbide, ethylene-vinyl acetate copolymers, phenol resins, polycarbonate resins, polyester resins, polyamide resins and soluble polyimide resins.

In the composition of the present invention, in the case where such another polymer is additionally used, the components A and C may be in a weight proportion of component A: component C=100:10 to (weight ratio), and the components D and C may be in a weight proportion of component D: component C=100:10 to 100:100 (weight ratio). The component B may be contained in an amount of from 0.1 to 10 parts by weight on the basis of 100 parts by weight of the total composition containing the binder polymer.

With regard to specific processes for using the composition in the present invention, the processes are exemplified below. In the case where the composition is cured with an activation energy ray, as described previously the photo cationic polymerization catalyst capable of releasing a Lewis acid by light is added as a catalyst and used. In the case where the composition is cured by heating, a Lewis acid such as a trifluoroboron amine catalyst may be added and used.

(Processes for forming coatings)

When the fluorine-containing epoxy resin composition of the present invention is used, it is dissolved in an organic solvent such as an aromatic type, aliphatic hydrocarbon type, ester type, ether type or fluorine type solvent. When the film thickness of a coating is as small as several μm, usual precision coating machines such as a roll coater, a spin coater and a spray coater may be used.

A first process for performing a surface treatment in a pattern can be carried out by taking successively the first step of applying the fluorine-containing epoxy resin composition of the present invention onto a substrate (treating object) and drying the applied resin composition; the second step of irradiating the applied composition with an activation energy ray in a pattern by use of a mask to selectively cure the composition; and the third step of effecting a developing treatment by use of a developing solution to dissolve and remove a part of the applied composition not irradiated with the activation energy ray in the second step. Basic steps are the same as those of photolithography, but it is necessary to select as the developing solution a solvent suited for the resin composition. As the developing solution, there are used aromatic hydrocarbons, ketones, esters, glycol ethers and mixtures thereof. In order to make the reaction of the resin composition complete, it is preferred that heating or irradiation with an activation energy ray is further carried out (fourth step) after the development.

A second process for performing a surface treatment in a pattern can be carried out by taking successively the first step of applying the fluorine-containing epoxy resin composition of the present invention onto a substrate and drying the applied resin composition; the second step of heating or irradiating with an activation energy ray the whole area of the applied composition to accelerate polymerization to effect curing; and the third step of irradiating the cured composition with a breaking activation energy ray so as to selectively remove a desired part of the cured composition.

In the second process, in order to make the reaction complete, it is also preferred that heating or irradiation with an activation energy ray is further carried out (fourth step) in any stage. the composition may preferably be heated or exposed to a polymerizing activation energy ray at any stage (fourth step).

As the activation energy ray to accelerate the polymerization, ultraviolet rays rich in light with a wavelength of 250 to 480 nm may be used. As the breaking activation energy ray, light with a wavelength of 210 nm or less or an excimer laser may be used.

Thus, the fluorine-containing epoxy resin composition of the present invention is suited as a water-repellent agent or water-repellent coating material applied to places having opportunities of contact with solutions or materials containing components that may decrease the adhesion of water repellent agents, such as polar organic solvents, and also can make preferably the water-repellent and ink-repellent treatment of the discharge opening surface of an ink jet recording head.

According to the surface modification process of the present invention, the water-repellent and oil-repellent treatment can be performed so as to have good adhesion to the substrate and good surface hardness, whereby modification promising excellent durability can be made.

As its application to the ink jet recording heads, the discharge opening surfaces are treated with the composition of the present invention to form surfaces with good release properties which do not allow the ink to adhere strongly thereto but allow the ink to be readily wiped off by cleaning. In most cleaning mechanisms mounted on ink jet recording heads, cleaning is performed by wiping with a rubber blade, sucking with a pump, discharge at a position other than on recording paper, and so on. However, even when any one of these methods is used, since not all of the ink turns into a liquid droplet when an ink column withdrawn by discharge pressure forms into the liquid droplet, it is impossible to perfectly prevent fine droplets of any excess ink from adhering to the circumference of the discharge opening. Accordingly, if these fine droplets can drop spontaneously, be sucked back to the inside of the discharge opening, or be removed with ease, they no longer affect the discharge of ink.

The fluorine-containing epoxy resin composition of the present invention can be cured at a relatively low temperature, and can provide a cured product having superior water and oil repellency, adhesion, chemical resistance and friction resistance.

Figure 2:
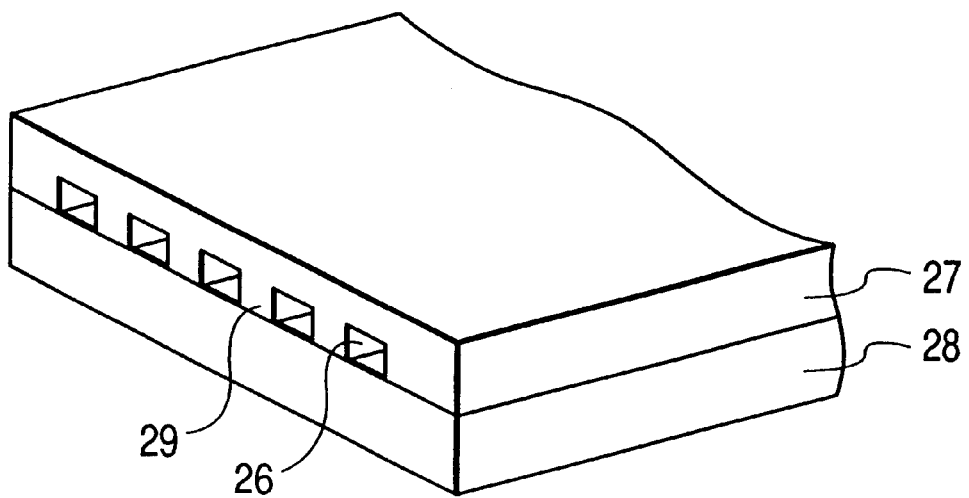
FIG. 2 is a perspective view of the main part of the ink jet recording head of FIG. 1.

FIGS. 1 and 2 show a main part of an example of the structure of an ink jet recording head to which the fluorine-containing epoxy resin composition of the present invention is applicable. FIG. 1 is a cross-sectional view along an ink flow path, and FIG. 2 a perspective view.

This recording head 13 has a constitution such that onto a substrate 15 having arranged thereon discharge energy generating elements and the like, there are stacked and bonded a member which has been formed so as to have at least flow paths by shaping a cured product of a thermosetting resin composition and/or an activation energy ray curing resin composition in a predetermined pattern. The substrate has a constitution such that on a surface of a base member 20 comprised of a material having good heat dissipation properties such as alumina, are stacked in the named order a heat accumulating layer 19, a heat generating resistor layer 18 formed of a metal, electrodes 17a and 17b formed of aluminum or the like, and a protective layer 16. Energizing the electrodes 17a and 17b results in heat generation of discharge energy generating elements formed at parts of the heat generating resistor layer 18 having no electrode stacked thereon (the part present in the region shown by letter symbol n), thereby applying heat energy to a recording liquid positioned above those parts.

In recording, the recording liquid 21 is filled in a flow path of the member 14 up to its discharge opening 22 which is a minute opening provided at an end portion of the flow path. In this state, when the electrodes 17-1 and 17-2 are energized in accordance with a recording signal, heat is generated abruptly at the region denoted by n, so that a bubble is generated by film boiling in the recording liquid 21 in contact with this region. By the pressure of the bubble, the recording liquid 21 is discharged from the discharge opening 22 in the form of a small droplet against a recording medium 25.

In the ink jet recording head of the present invention, a cured product of the fluorine-containing epoxy resin composition is applied as a water-repellent and ink-repellent agent at least at a discharge opening formed portion of a discharge opening surface 29, so that the droplets can be prevented from adhering to this surface and causing aberration of the discharge direction of the droplets. Moreover, the cured product of the fluorine-containing epoxy resin composition not only has excellent adhesion, but also its water repellency and adhesion are by no means decreased by any organic solvent, in particular, polar organic solvent contained in the recording liquid.

In FIG. 2, reference numeral 26 denotes a discharge opening; 27, a member in which liquid flow paths have been formed; 28, a substrate on which discharge energy generating elements have been provided; and 29, the discharge opening surface.

Figure 3:
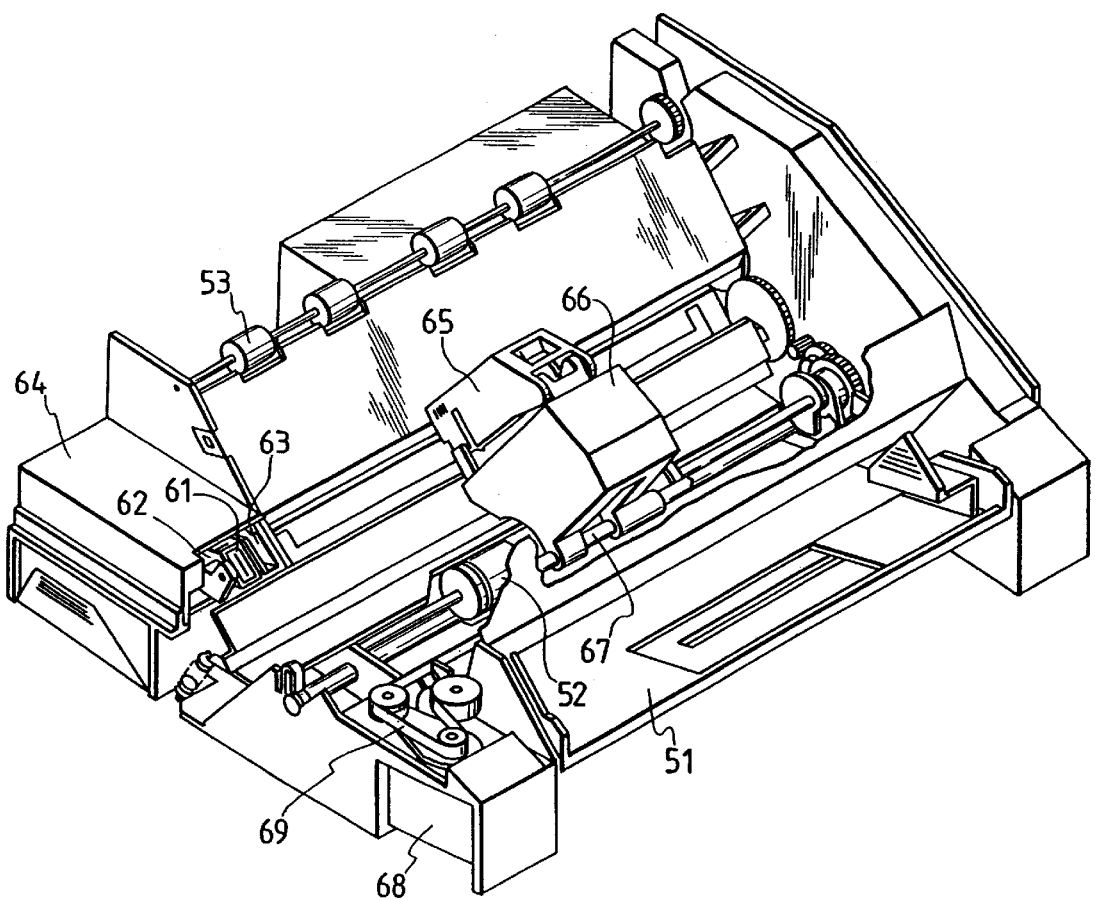
FIG. 3 is a view showing an example of an ink jet recording apparatus incorporated with the ink jet recording head of FIG. 2.

FIG. 3 shows an example of an ink jet recording apparatus in which a multi-head like the one shown in FIG. 2 has been incorporated. In FIG. 3, reference numeral 61 denotes a blade serving as a wiping member, one end of which is retained by a blade-retaining member to be a fixed end in the form of a cantilever. The blade 61 is provided at the position adjacent to the region in which a recording head makes a record. In the present example, the blade is retained in such a form that it projects to the course through which the recording head is moved. Reference numeral 62 denotes a cap, which is provided at a home position adjacent to the blade 61, and is so constituted that it moves in the direction perpendicular to the direction in which the recording head is moved and comes into contact with the discharge openings to carry out capping. Reference numeral 63 denotes an ink absorber provided adjacent the blade 61, and is retained in such a form that it projects to the course through which the recording head is moved, as with the blade 61. The blade 61, cap 62 and ink absorber 63 constitute a discharge restoration portion 64, where the blade 61 and the ink absorber 63 remove the water, dust and so forth from the ink discharge opening surface.

Reference numeral 65 denotes a recording head which performs recording by the ink jet system, and has a constitution such as that shown in FIGS. 1 and 2 where the recording liquid such as ink is discharged by heat energy. Reference numeral 66 denotes a carriage for mounting the recording head 65 thereon to move the recording head 65. The carriage 66 is associated slidably with a guide shaft 67, and a part of the carriage 66 is connected (not shown) with a belt 69 driven by a motor 68. Thus, the carriage 66 can be moved along the guide 67, that is, over the recording region by the recording head 65 and a region adjacent thereto.

Reference numeral 51 denotes a paper feeding portion from which a recording medium is inserted, and 52 is a paper feeding roller driven by a motor (not shown). With such construction, the recording medium is fed to the position opposite to the discharge opening surface of the recording head and then outputted through a paper output roller 53 with the progress of recording.

In the above constitution, when the recording head 65 is returned to the home position after completion of recording, the cap 62 of the head restoration portion 64 is receded from the moving course of the recording head 65 but the blade 61 stands projected to the moving course. As the result, the discharge opening surface of the recording head 65 is wiped. Further, when the cap 62 comes into contact with the discharge opening surface of the recording head 65 to carry out capping, the cap 62 is moved in such a way that it projects to the moving course of the recording head.

When the recording head 65 is moved from the home position to the position at which recording is started, the cap 62 and the blade 61 are at the same position as the position where the discharge opening surface is wiped. As the result, the discharge opening surface of the recording head 65 is wiped also at the time of this movement.

The above movement of the recording head to the home position is made not only at the time of the completion of recording or restoration of discharge, but also when the recording head is moved within the recording region for recording, during which it is moved to the home position adjacent to the recording region at given intervals, where the discharge opening surface is wiped in accordance with this movement.

In the ink jet recording apparatus, in the case of color recording, it can be performed using a recording head having discharge openings for cyan, magenta, yellow and black inks arranged in one head. Alternatively, recording heads for the respective colors may be arranged independently in parallel.

In these cases, each of the color inks may be discharged from one discharge opening, or each of the color inks may be discharged simultaneously from a plurality of discharge openings so that two or more droplets of the same color may arrive at the recording medium at the same time.

The recording head of the present invention is surface-treated with the ink-repellent treating material of the material constitution as described above and has chemical properties as demonstrated in the following Examples. Hence, the adhesion of the ink jet recording ink is less, and any ink that has adhered can be removed very readily by the cleaning wiper blade. This brings about a breakthrough improvement in substantial durability of printing.

EXAMPLES

The present invention will be described below in greater detail by giving Examples.

Examples 1 to 19

Solutions of 30 to 40% by weight of Compositional Examples 1 to 19 described previously, in a 1:1 mixed solvent of diethylene glycol dimethyl ether and toluene were prepared. These were each applied on a silicon wafer substrate having a thermal oxide film of 5 µm thick, in a wet-coating thickness of 1 µm to 3 µm by means of a spin coater. Subsequently, this substrate was dried on a 110° C. hot plate for 5 minutes to remove the solvent. The substrate thus treated was irradiated with ultraviolet rays of 2 J/cm$^2$ in an integral quantity by means of an ultraviolet irradiating apparatus using a high-pressure mercury lamp, followed by heating in a 150° C. furnace for 15 minutes to complete the curing reaction.

Using the substrates thus prepared, the following measurement was made.

T1: Measurement of Contact Angle:

Using each of pure water, an aqueous 10% by weight oleic acid solution, an aqueous 20% by weight glycerol solution and an aqueous 1% by weight surface-active agent solution [polyoxyethylene nonylphenyl ether; HLB (hydrophobic-lipophobic balance)=10], static contact angles were measured at room temperature.

T2: Measurement of Contact Angle after Immersion in Aqueous Dye Solution

In an aqueous 3% by weight solution of water-soluble dye C.I. Direct Black 168 (pH-10.3), the substrate having been subjected to ink-repellent treatment was immersed at 60° C. for 7 days. Thereafter, this substrate was washed with pure water, followed by drying, and contact angles to ink were again measured.

Figure 4A:
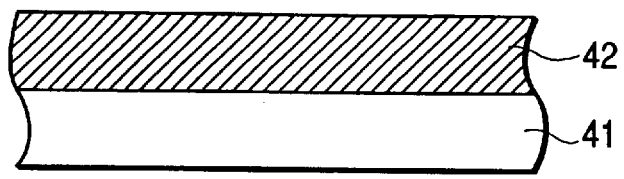
FIGS. 4A, 4B, 4C, 4D and 4E are views showing the steps for producing an ink jet recording head in the examples of the present invention.
Figure 4B:
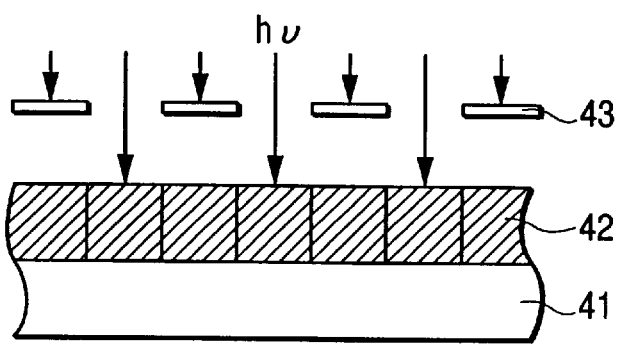
Figure 4C:
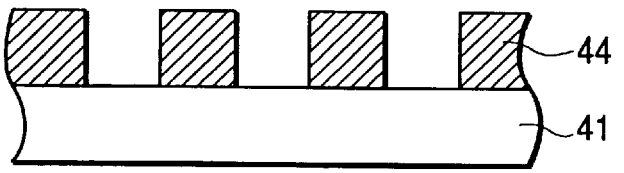
Figure 4D:
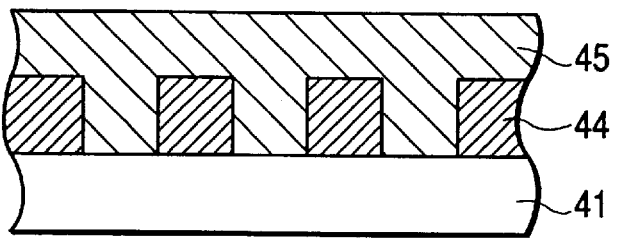

T3:

As shown in FIG. 4A, on a substrate 41 provided beforehand with the discharge energy generating element and the like, a positive photoresist 42 (PMER AR-900 (trade name) available from Tokyo Ohka Kogyo Co., Ltd.) was spin-coated in a thickness of 30 µm, followed by prebaking at 90° C. for 40 minutes in an oven to form a resist layer. Thereafter, as shown in FIGS. 4B and 4C, the resist layer was patterned using a mask 43 to obtain a resist pattern 44. On the resist pattern 44, as shown in FIG. 4D, a flow path-forming material prepared by mixing a chief material composed as shown in Table 2 below and a curing agent (a modified aliphatic amine FUJICURE FXK830 (trade name) available from Fuji Kasei Kogyo Co., Ltd.) in a proportion of chief material/curing agent=100/50 (weight ratio) was stacked in a layer thickness of 100 µm.

TABLE 2

Chief-Material Constitution of Two-part Epoxy Resin Composition

| Composition | Parts* |
| --- | --- |
| EPIKOTE 828 ((trade name) available from Yuka Shell Epoxy K.K.) | 75 |

TABLE 2-continued

Chief-Material Constitution of Two-part Epoxy Resin Composition

| Composition | Parts* |
| --- | --- |
| 1,3-Bis(3-glycidoxypropyl)tetramethyldisiloxane | 25 |
| NUC silane coupling agent A-187 ((trade name) available from Nippon Unicar Co., Ltd.) | 5 |

*by weight

Figure 4E:
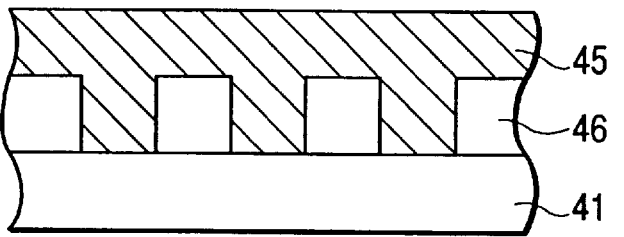

After a flow path-forming material layer 45 was stacked, it was left at 25° C. for 24 hours, followed by further heat curing treatment at 100° C. for 2 hours. Next, the stack thus obtained was immersed in an aqueous 3% by weight sodium hydroxide solution to dissolve and remove the resist pattern 44, followed by washing and then drying to form liquid flow paths 46 (FIG. 4E). Thus, an ink jet recording head was obtained.

On the discharge opening surfaces of ink jet recording heads obtained in this way, the fluorine-containing epoxy resin compositions of Examples 1 to 19 were applied individually, which were then cured by exposure to ultraviolet rays of 8 J/cm$^2$ and by heating at 150° C. for 1 hour.

The ink jet recording heads thus treated were each further wired electrically in a given form and incorporated in a printer to make a long-term print running test by use of an ink jet recording ink made of pure water/glycerol/C.I. Food Black 2 (a water-soluble black dye)/N-methylpyrrolidone= 70/15/3/12 (parts by weight).

In the print running test, a pattern for evaluating characters and ink-droplet impact precision was printed on 100 sheets, and evaluation was made on any dot disorder on the last print sample. Results obtained are designated as T3-1.

Evaluated as A:
No dot positional disorder is seen, and characters are sharp.

Evaluated as B:
Dot positional disorder is a little seen, but affects character quality level only slightly.

Evaluated as C:
Dot positional disorder is fairly seen, and also characters have a lowered sharpness.

Evaluated as D:
Dot break-off has occurred and character quality level has lowered greatly.

The surfaces of the ink jet recording heads used were also observed to evaluate the ink adhesion quantity. Results obtained are designated as T3-2.

Evaluated as A:
Ink drops are little seen on the discharge opening surface.

Evaluated as B:
Small ink drops are seen on the discharge opening surface.

Evaluated as C:
Large ink drops are seen in the vicinity of discharge openings.

The results of the foregoing are summarized in Tables 3 and 4 below.

Comparative Example 1

A fluororesin coating material (FLUORAD FC-722 (trade name) available from Sumitomo 3M Limited) was used in place of the fluorine-containing epoxy resin composition of the present invention, and the curing conditions were changed to drying at 100° C. for 30 minutes. Evaluation was made on the above T1 to T3 in the same manner as in Examples 1–19.

Comparative Example 2

Test substrates and recording heads were produced under the same coating and curing conditions as in Examples 1–19 except for using the following composition making use of fluorine-containing epoxy resins, compounds represented by the following structural formulae E-1 and E-2.

$$CH_2-CH-CH_2-O-\phenyl-\underset{CF_3}{\overset{CF_3}{C}}-\phenyl-O-CH_2-CH-CH_2 \quad \text{(E-1)}$$

$$CH_2-CH-CH_2-O-CH_2CH_2-(CF_2)_{\overline{7}}CF_3 \quad \text{(E-2)}$$

| composition: | (parts by weight) |
|---|---|
| E-1 | 14 |
| E-2 | 5 |
| B-3 | 1 |
| Propylene carbonate | 10 |
| Xylene | 40 |
| Methyl isobutyl ketone | 30 |

TABLE 3

Evaluation results

| | Coating thickness (μm) | T1 Contact angles | | | | T2 (Immersion test) Contact angles | | T3 (Long-term print running test) | |
|---|---|---|---|---|---|---|---|---|---|
| | | Pure water (°) | Oleic acid (°) | Glycerol (°) | Surfactant (°) | Before (°) | After (°) | T3-1 | T3-2 |
| Example: | | | | | | | | | |
| 1 | 1.2 | 92 | 81 | 92 | 87 | 92 | 86 | B | B |
| 2 | 1.0 | 90 | 85 | 86 | 86 | 86 | 79 | A | A |
| 3 | 1.5 | 96 | 83 | 93 | 87 | 93 | 85 | A | B |
| 4 | 0.9 | 93 | 80 | 92 | 84 | 90 | 81 | B | A |
| 5 | 1.7 | 92 | 84 | 91 | 90 | 91 | 83 | B | A |
| 6 | 1.0 | 97 | 82 | 95 | 92 | 93 | 80 | A | B |
| 7 | 2.1 | 94 | 88 | 95 | 94 | 95 | 81 | B | B |
| 8 | 1.8 | 98 | 86 | 92 | 95 | 90 | 82 | A | A |
| 9 | 1.4 | 94 | 82 | 92 | 92 | 90 | 82 | A | A |

TABLE 4

Evaluation results

| | Coating thickness (μm) | T1 Contact angles | | | | T2 (Immersion test) Contact angles | | T3 (Long-term print running test) | |
|---|---|---|---|---|---|---|---|---|---|
| | | Pure water (°) | Oleic acid (°) | Glycerol (°) | Surfactant (°) | Before (°) | After (°) | T3-1 | T3-2 |
| Example: | | | | | | | | | |
| 10 | 1.5 | 97 | 85 | 96 | 93 | 97 | 90 | A | B |
| 11 | 1.5 | 100 | 87 | 98 | 90 | 101 | 88 | A | A |
| 12 | 1.3 | 103 | 85 | 100 | 87 | 98 | 87 | A | B |
| 13 | 1.0 | 94 | 80 | 94 | 87 | 90 | 86 | B | A |
| 14 | 1.6 | 106 | 86 | 103 | 94 | 92 | 87 | A | A |
| 15 | 1.8 | 98 | 76 | 100 | 91 | 90 | 82 | A | B |
| 16 | 0.9 | 104 | 80 | 102 | 97 | 95 | 90 | A | A |
| 17 | 1.2 | 103 | 84 | 92 | 95 | 94 | 89 | B | B |

TABLE 4-continued

| | | Evaluation results | | | | | | |
|---|---|---|---|---|---|---|---|---|
| | | T1 Contact angles | | | | T2 (Immersion test) | | T3 (Long-term |
| | Coating | Pure | Oleic | | | Contact angles | | print run- |
| | thickness | water | acid | Glycerol | Surfactant | Before | After | ning test) |
| | (μm) | (°) | (°) | (°) | (°) | (°) | (°) | T3-1 | T3-2 |
| 18 | 1.6 | 103 | 83 | 93 | 92 | 95 | 86 | A | B |
| 19 | 1.5 | 100 | 83 | 99 | 91 | 99 | 89 | A | A |
| Comparative Example: | | | | | | | | | |
| 1 | 2.4 | 90 | 72 | 90 | 85 | 90 | 74 | C | C |
| 2 | 1.7 | 93 | 78 | 93 | 83 | 88 | 73 | C | C |

As shown above, the coatings comprised of the fluorine-containing epoxy resin composition of the present invention have large contact angles and also can maintain such angles well. Also, even when inks are in contact with them over a long period of time, the inks do not adhere to the recording head surfaces, so that a good ink-droplet impact precision for dots can be achieved and print quality level can be maintained for a long term.

Example 20

The compositions of Examples 10, 11, 14, 18 and 19 were applied on molded sheets of polyether sulfone by a spin coater in a film thickness of about 2 μm each as thickness after solvent evaporation. The substrates thus coated were irradiated with light of 10 J/cm² in total from a high-pressure mercury lamp to effect polymerization. Next, the substrates thus treated were irradiated from above the coatings with excimer laser light with a wavelength of 195 nm converged to a beam diameter of 5 μm, thus forming openings for the discharge openings. The openings were formed well, and were in a processed state with less decomposition residues at the edge areas. Thus, it can be seen that the composition of the present invention has a superior suitability also to ultraviolet laser processing.

It can be seen from the above description that the fluorine-containing epoxy resin composition of the present invention is curable at a low temperature, has so good an adhesion as to enable easy formation of a coating in a desired pattern shape, and also enables a surface modification treatment which imparts a good water repellency. Accordingly, the present invention can provide an ink jet recording apparatus which is provided with an ink jet recording head having a good ink repellency at discharge openings and that can perform highly precise printing.

What is claimed is:

1. A fluorine-containing epoxy resin composition comprising a fluorine-containing aliphatic epoxy resin and a cationic polymerization catalyst, wherein the fluorine-containing aliphatic epoxy resin is at least one of the compounds represented by the following general formulae (A-1) and (A-2):

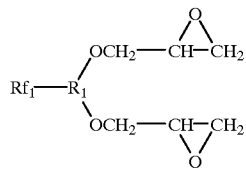
(A-1)

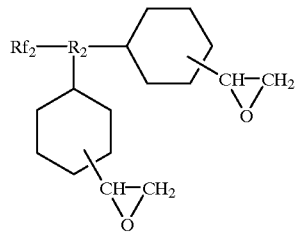
(A-2)

wherein $Rf_1$ and $Rf_2$ are independently selected from $(CF_2)_n$—$CF_3$ or

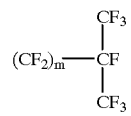

wherein n is 5–11 and m is 3–9;

and $R_1$ and $R_2$ are aliphatic groups.

2. A fluorine-containing epoxy resin composition comprising a fluorine-containing aliphatic epoxy resin comprising in one molecule at least one perfluoroalkyl group having 6–12 carbon atoms and at least two epoxy groups, and a cationic polymerization catalyst, further comprising, as a compatibilizing agent, at least one of the compounds represented by the following general formulae (C-1) and (C-2):

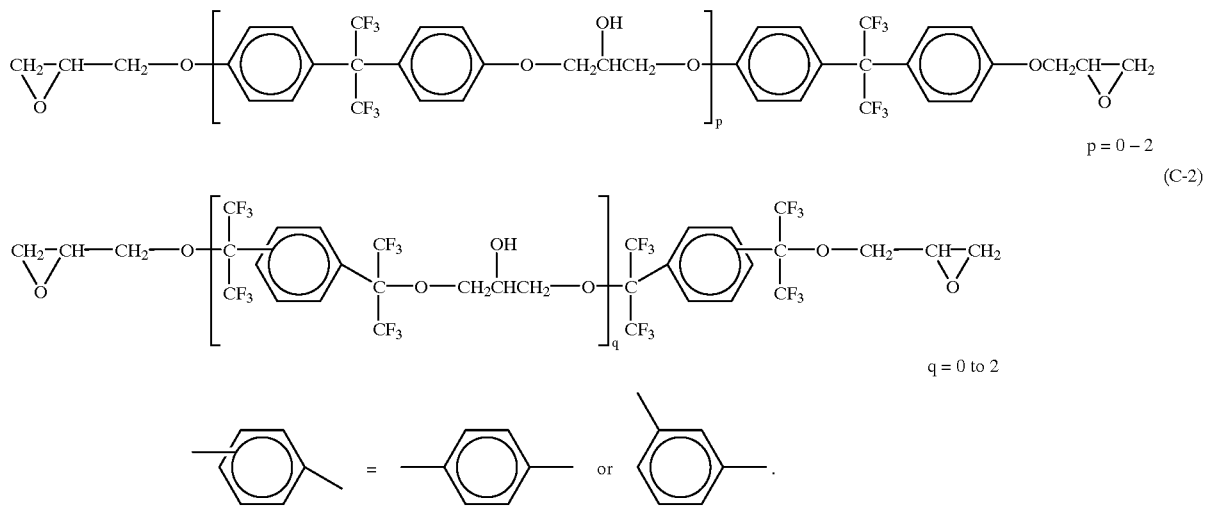

3. A fluorine-containing epoxy resin composition comprising a fluorine-containing polyether resin comprising in a main chain an alicyclic hydrocarbon group comprising in a side chain at least one perfluoroalkyl group having 6–12 carbon atoms and at least two epoxy groups, and a cationic polymerization catalyst.

4. The fluorine-containing epoxy resin composition according to claim 3, wherein the fluorine-containing polyether resin is a polymer comprising an epoxy structural unit represented by the following general formula (D-1) or (D-2) and a perfluoro structural unit represented by the following general formula (D-3) or (D-4):

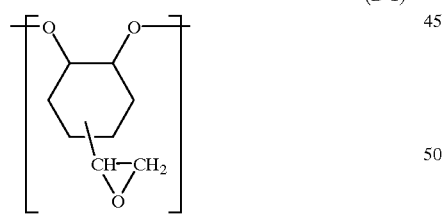

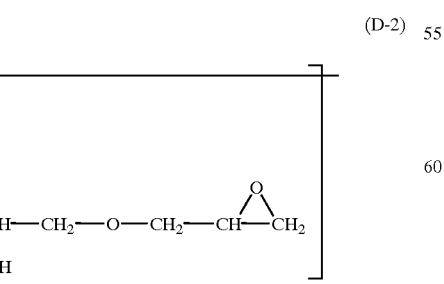

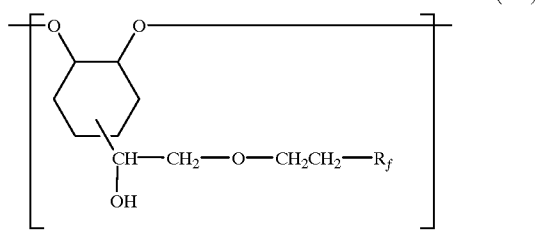

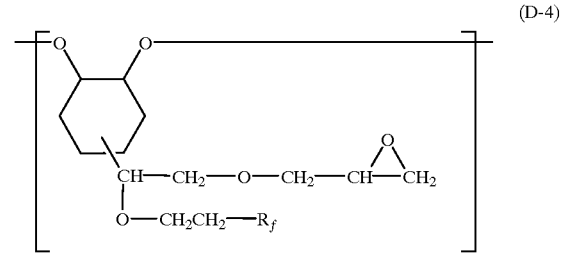

wherein Rf is selected from $CF_3-(CF_2)_x-$ or

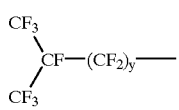

wherein x is 5–11 and y is 3–9;

and the total number of the structural units is 3–28.

5. The fluorine-containing epoxy resin composition according to claim 3, further comprising, as a compatibilizing agent, at least one of the compounds represented by the following general formulae (C-1) and (C-2):

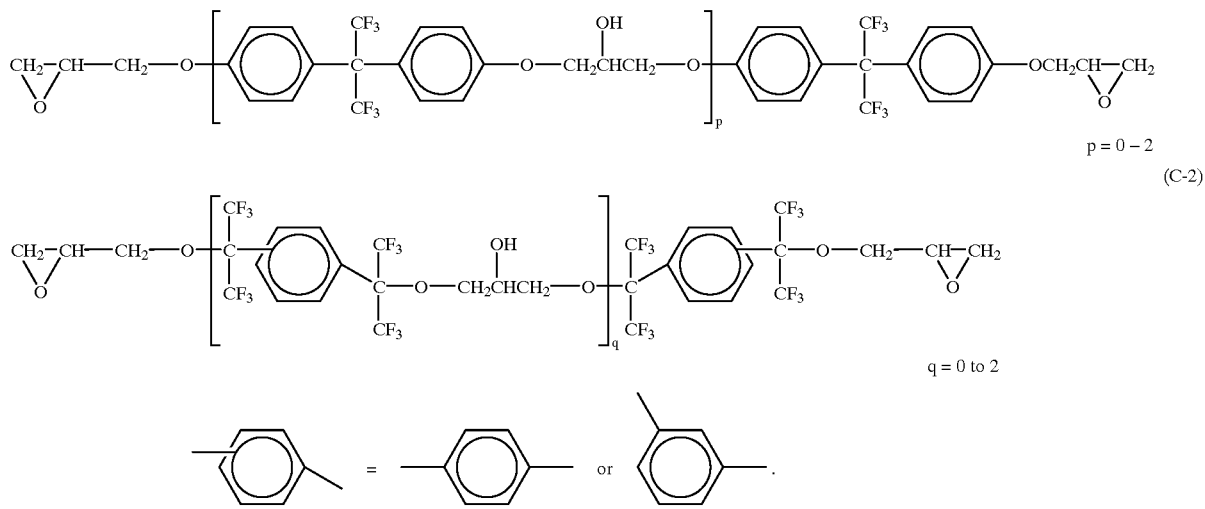

6. A surface treatment process for treating a surface of a substrate selectively, which comprises successively:
 a first step of applying the fluorine-containing epoxy resin composition as set forth in claim 1 or 2, onto a substrate and drying the applied resin composition;
 a second step of irradiating the applied composition with an activation energy ray in a pattern through a mask;
 a third step of dissolving and removing a part of the applied composition not irradiated with the activation energy ray, by use of a liquid capable of dissolving the composition; and if desired
 a fourth step of post-curing the remaining composition.

7. A surface treatment process for treating a surface of a substrate selectively, which comprises successively:
 a first step of applying the fluorine-containing epoxy resin composition as set forth in claim 1 or 2 onto a substrate and drying the applied resin composition;
 a second step of heating or irradiating with an activation energy ray the applied composition to effect polymerization and curing over the whole area thereof;
 a third step of selectively irradiating the cured composition with a breaking activation energy ray to partly remove the cured composition; and if desired
 a fourth step of post-curing the remaining composition.

8. An ink jet recording head having a discharge opening surface with a discharge opening for discharging a recording liquid therethrough, wherein at least a discharge opening formed portion of the discharge opening surface is coated with a cured film comprising the fluorine-containing epoxy resin composition as set forth in claim 1 or 2, and an ink jet recording apparatus comprising the ink jet recording head.

9. An ink jet recording apparatus comprising the ink jet recording head as set forth in claim 8.

* * * * *

UNITED STATES PATENT AND TRADEMARK OFFICE
CERTIFICATE OF CORRECTION

PATENT NO. : 6,344,526 B1
DATED : February 5, 2002
INVENTOR(S) : Hiromichi Noguchi et al.

It is certified that error appears in the above-identified patent and that said Letters Patent is hereby corrected as shown below:

Title page,
Item [74], *Attorney, Agent, or Firm* "Fitzpatrick, Cella Harper & Scinto"
should read -- Fitzpatrick, Cella, Harper & Scinto --.
Item [57], ABSTRACT,
Line 3, "lest" should read -- least --.

Column 1,
Line 39, "Jet" should read -- jet --.

Column 5,
Line 58, "desired the fourth" should read -- desired ¶the fourth --.

Column 13,
Line 2, "may" should read -- may be --.

Column 15,
Line 53, "(weight ratio)," should read -- 100:60 (weight ratio), --.

Column 16,
Line 38, "the" should read -- The --.

Column 19,
Line 38, "(pH-10.3)," should read -- (pH=10.3), --

Signed and Sealed this

Eighteenth Day of February, 2003

JAMES E. ROGAN
*Director of the United States Patent and Trademark Office*